(12) United States Patent
Nelson et al.

(10) Patent No.: US 6,925,788 B2
(45) Date of Patent: *Aug. 9, 2005

(54) BALER ROTOR REVERSER

(75) Inventors: Bradley D. Nelson, Pella, IA (US); William A. Hood, Pella, IA (US); Ryan G. Walker, Newton, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/763,459

(22) Filed: Jan. 23, 2004

(65) Prior Publication Data
US 2004/0159087 A1 Aug. 19, 2004

Related U.S. Application Data

(63) Continuation of application No. 09/776,531, filed on Feb. 2, 2001, now Pat. No. 6,681,552.

(51) Int. Cl.$^7$ .......................... A01D 69/08; A01D 39/00
(52) U.S. Cl. ............................. 56/11.2; 56/10.2; 56/341
(58) Field of Search ................................ 56/10.3, 10.8, 56/11.2, 11.3, 341, 343, DIG. 6

(56) References Cited

U.S. PATENT DOCUMENTS

| | | |
|---|---|---|
| 4,261,161 A | 4/1981 | Colgrove |
| 4,512,139 A | 4/1985 | Musser |
| 4,663,919 A | 5/1987 | Stroh |
| 5,462,486 A | 10/1995 | Norton |
| 5,527,218 A | 6/1996 | Van den Bossche |
| 5,752,374 A | 5/1998 | Allworden |
| 5,778,644 A | 7/1998 | Keller |
| 5,894,718 A | 4/1999 | Hawlas |
| 5,996,324 A | 12/1999 | Oligmueller |
| 6,105,353 A | 8/2000 | Mohr |
| 6,161,368 A | 12/2000 | Wilkens |
| 6,247,296 B1 * | 6/2001 | Becker et al. ............... 56/11.2 |
| 6,298,646 B1 | 10/2001 | Schrag |
| 6,318,056 B1 | 11/2001 | Rauch |
| 6,644,005 B1 * | 11/2003 | Grahl et al. .................. 56/341 |
| 6,644,006 B1 | 11/2003 | Merritt |

FOREIGN PATENT DOCUMENTS

| | | |
|---|---|---|
| DE | 3506461 | 8/1986 |
| DE | 19534138 | 10/1996 |
| EP | 0339734 | 11/1989 |
| FR | 2708828 | 2/1995 |
| GB | 857810 | 1/1961 |
| GB | 2169366 | 7/1986 |

OTHER PUBLICATIONS 3 sheets (color)—first pg. entitled CLAAS—Round Balers—Rollant 250—250 Roto Feed—250 RC—250 RC Comfort—by CLAAS of America, Inc.
4 pages (COLOR) photos—showing a CLAAS brand baler with manual reversing.

* cited by examiner

Primary Examiner—Robert E. Pezzuto
Assistant Examiner—Nathan Mammen
(74) Attorney, Agent, or Firm—Sturm & Fix LLP

(57) ABSTRACT

A reverser which, in a preferred embodiment, has a hydraulic cylinder supported by a chopper baler frame. The opposite end of the hydraulic cylinder is attached to the reverser driver. When activated by hydraulics on a tractor, the hydraulics will extend the cylinder, causing the sprockets to be disengaged. Further extension of the cylinder will cause the reverser driver to engage the reverser sprocket and turn the rotor backwards slightly. After full extension, the cylinder will then be retracted. This process can be repeated a couple of times in order to remove the blockage. The reverser enables the operator to restore the baler to its working condition from the tractor seat. Being able to disengage the rotor from the rest of the machine enables the bale to be wrapped if a major blockage occurs. Also a controlled reversing motion is beneficial, so over-reversing does not occur.

5 Claims, 6 Drawing Sheets

OPERATING POSITION

DISENGAGING POSITION

REVERSING POSITION

BALER ROTOR REVERSER

CROSS-REFERENCE TO RELATED APPLICATIONS

This application is a Continuation of U.S. patent application Ser. No. 09/776,531, filed Feb. 2, 2001, entitled BALER ROTOR REVERSER now U.S. Pat. No. 6,681,552.

STATEMENT REGARDING FEDERALLY SPONSORED RESEARCH OR DEVELOPMENT

Not Applicable

BACKGROUND OF THE INVENTION

1. Field of the Invention

This invention relates to a baler and more particularly to one which has a rotor for assisting the chopping of the crop before it enters a baling chamber and which allows the rotor to be reversed when the baler becomes plugged.

2. Description of the Related Art

In a chopper baler, there is a pickup reel which picks a windrow of crop up from the ground and transfers it to a rotor which forces the crop through knives which can be selectively engaged to cut the crop. This rotor effectively transfers the crop from the pickup reel to a baling chamber where the crop is turned into a bale. In the preferred embodiment, this baler is one for making large round bales, but this invention is not limited to a round baler.

From time to time, such a large amount of crop is moved from the reel to the rotor area that the crop is unable to pass through the throat of the machine. The rotor will then abruptly stop turning. This is termed a "blockage". Traditionally, the blockage is removed by hand or by use of a lever to manually turn the machine backwards to remove the blockage. Sometimes a powered shaft is used to turn the baler backwards. To some extent this is similar to combines which use electric starter motors or planetary drives that allow reversal of blockages.

The prior art of removing blockages by hand or with a lever or even with a powered shaft is time consuming and difficult. Consequently, there is a need for a device to more easily facilitate removing the blockage from a baler.

BRIEF SUMMARY OF THE INVENTION

The present invention relates to a reverser, which in a preferred embodiment has a hydraulic cylinder supported by a chopper baler frame. The opposite end of the hydraulic cylinder is attached to the reverser driver. When activated by hydraulics on a tractor, the hydraulics will extend the cylinder, causing the sprockets to be disengaged. Further extension of the cylinder will cause the reverser driver to engage the reverser sprocket and turn the rotor backwards slightly. After full extension, the cylinder will then be retracted. This process can be repeated a couple of times in order to remove the blockage.

The reverser enables the operator to restore the baler to its working condition from the tractor seat. Being able to disengage the rotor from the rest of the machine enables the bale to be wrapped if a major blockage occurs. Also a controlled reversing motion is beneficial, so over-reversing does not occur.

An object of the present invention is to provide an apparatus for allowing an operator to free the blockage of crop in a chopper baler from the tractor seat.

Another object of the present invention is to have a reverser which also disengages the rotor from the rest of the baler, to allow the bale to be wrapped in the event of a severe blockage.

A still further object of the present invention is to provide a reverser which reverses the rotor in incremental steps, thereby reducing the risk of damage to the machine.

Other objects, advantages and novel features of the present invention will become apparent from the following detailed description of the invention when considered in conjunction with the accompanying drawings.

DETAILED DESCRIPTION OF THE INVENTION

Figure 1:
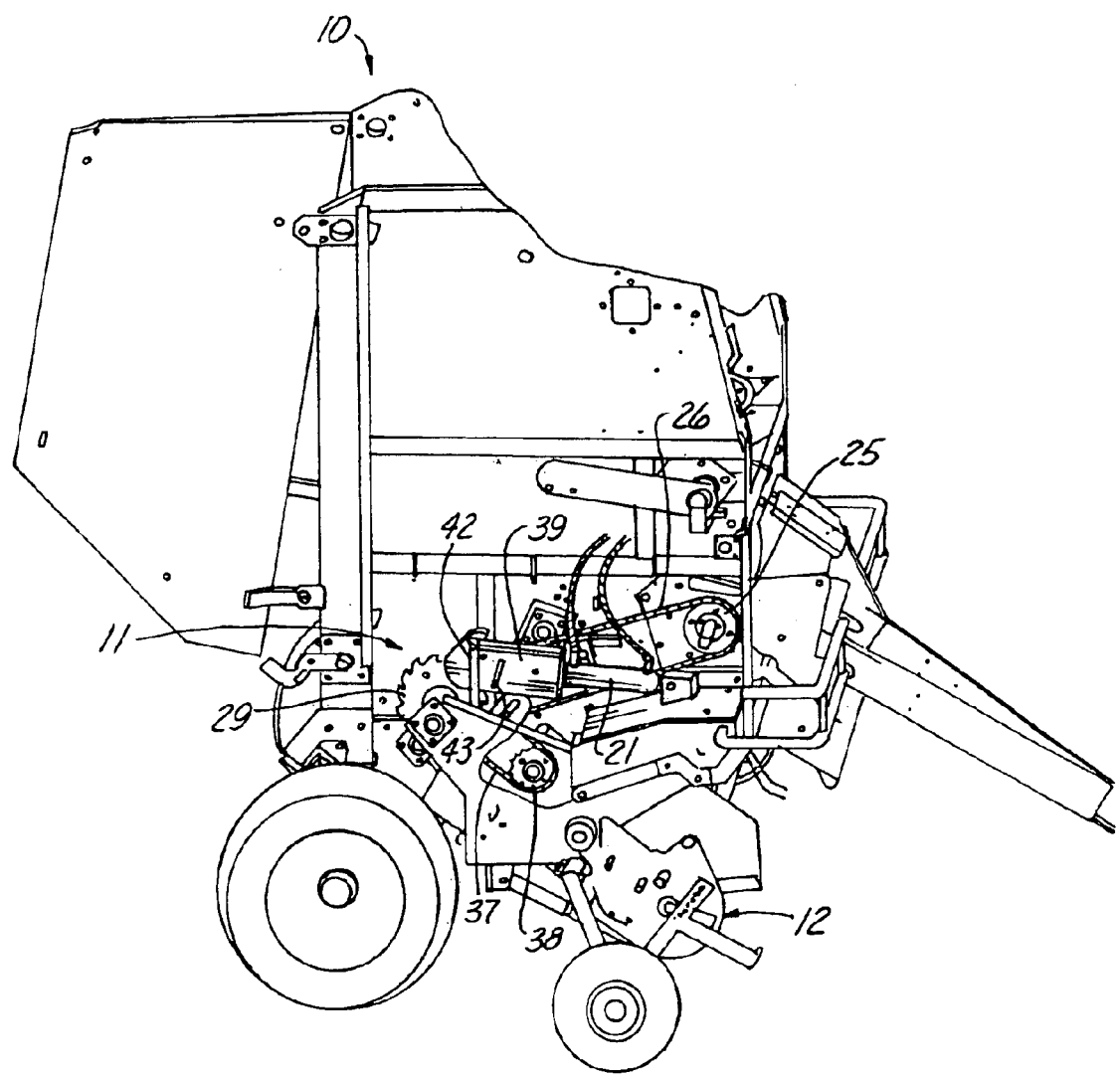
FIG. 1 is a side elevational view of a chopper baler incorporating the preferred embodiment of the present invention thereto.
Figure 2:
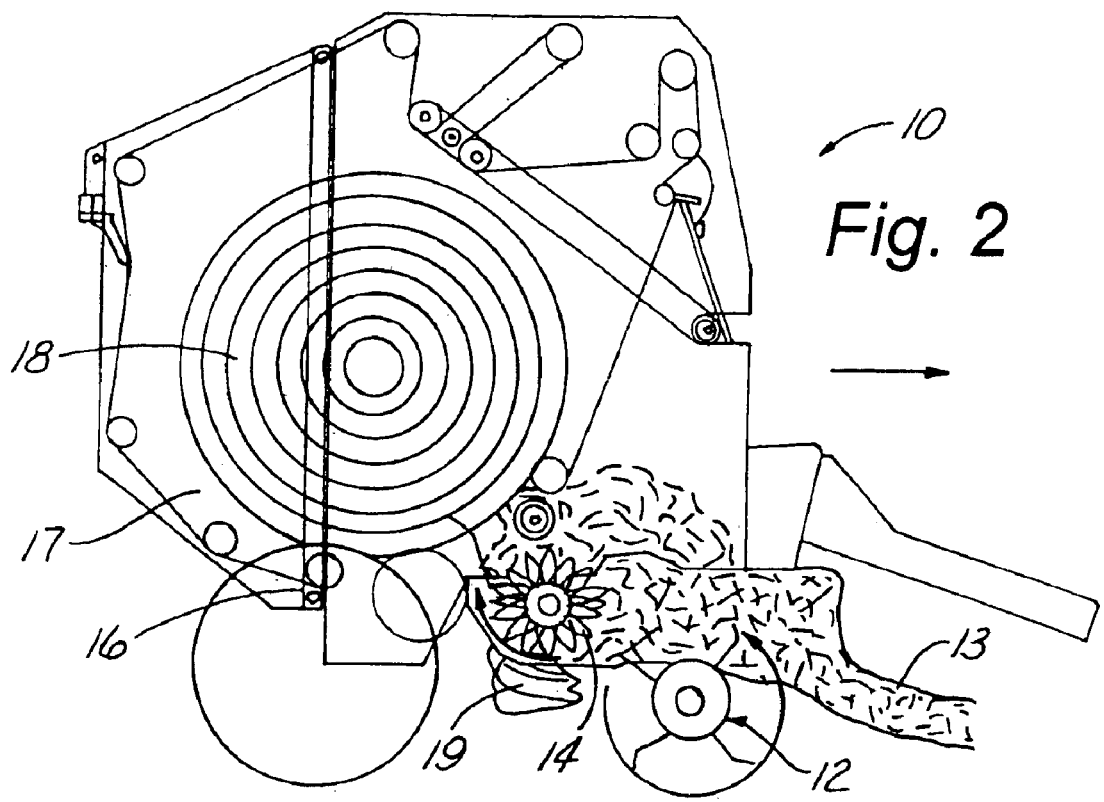
FIG. 2 is a cross sectional simplified view showing a bale being formed in a bale chamber, a pickup rotating to pull a windrow of crop to a rotor which rotates to move the crop to the baling chamber.

Referring now to the drawings, wherein like reference numerals designate identical or corresponding parts throughout the several views, FIG. 1 shows a baler (10) having a reverser (11) attached thereto. Referring now to FIG. 2, it is noted that a pickup reel (12) normally turns in a counter-clockwise direction as viewed in FIG. 2 to pull the windrow (13) of crop toward a rotor (14). This rotor (14) moves in a clockwise direction in FIG. 2 to pull the crop into a throat portion (16) and ultimately into a baling chamber (17) to form a bale (18). This rotor (14) has knives (19) which can extend into and between the fingers of the rotor (14) and, when extended, will cut the crop (13) as it is passed the blades (19) by rotor (14). These knives (19) can also be disengaged by being moved downwardly in the position shown in FIG. 2, for example as shown in U.S. patent application Ser. No. 09/498,527, filed Feb. 4, 2000, now abandoned which is incorporated herein by reference.

Figure 4:
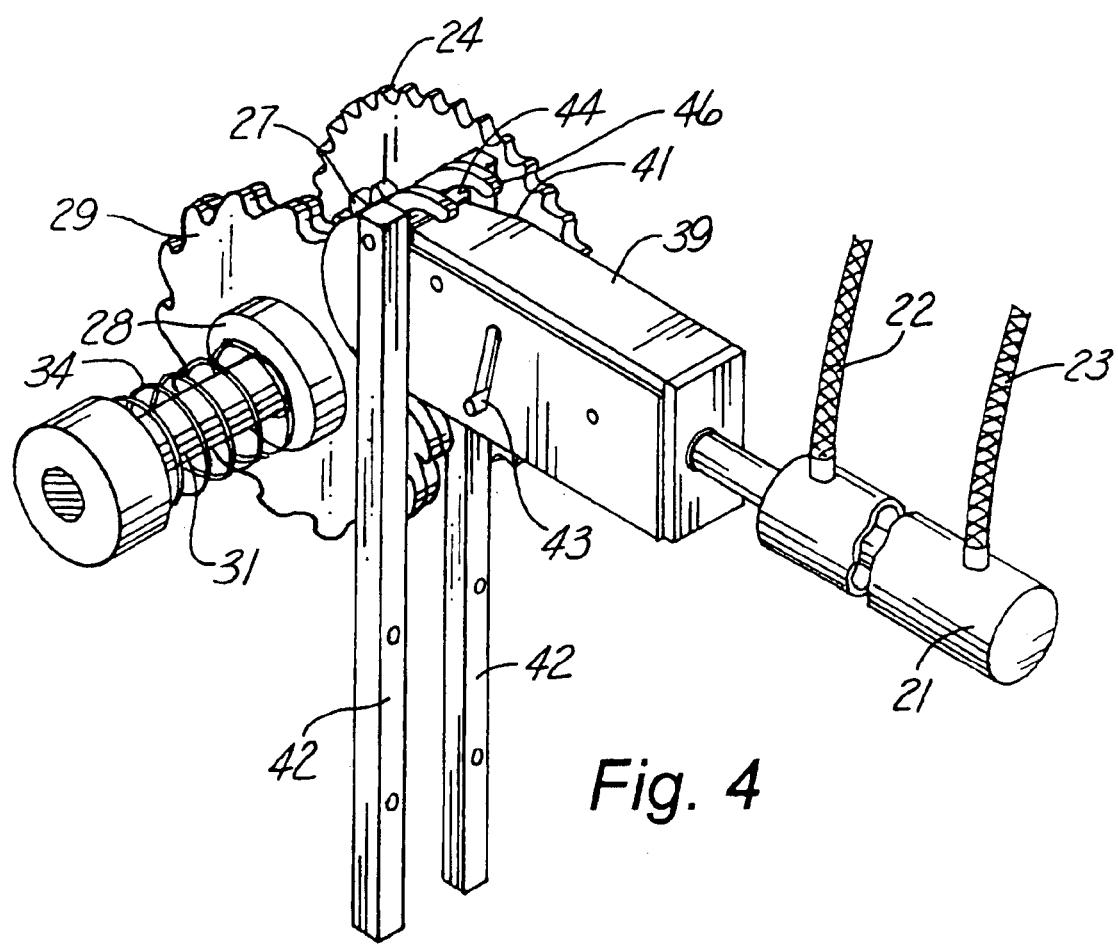
FIG. 4 is an enlarged perspective view of a preferred embodiment of the present invention.

Referring now to FIGS. 1 and 4, it is noted that a hydraulic cylinder (21) has hoses (22) and (23) associated therewith for extending or retracting the hydraulic cylinder (21).

Figure 5:
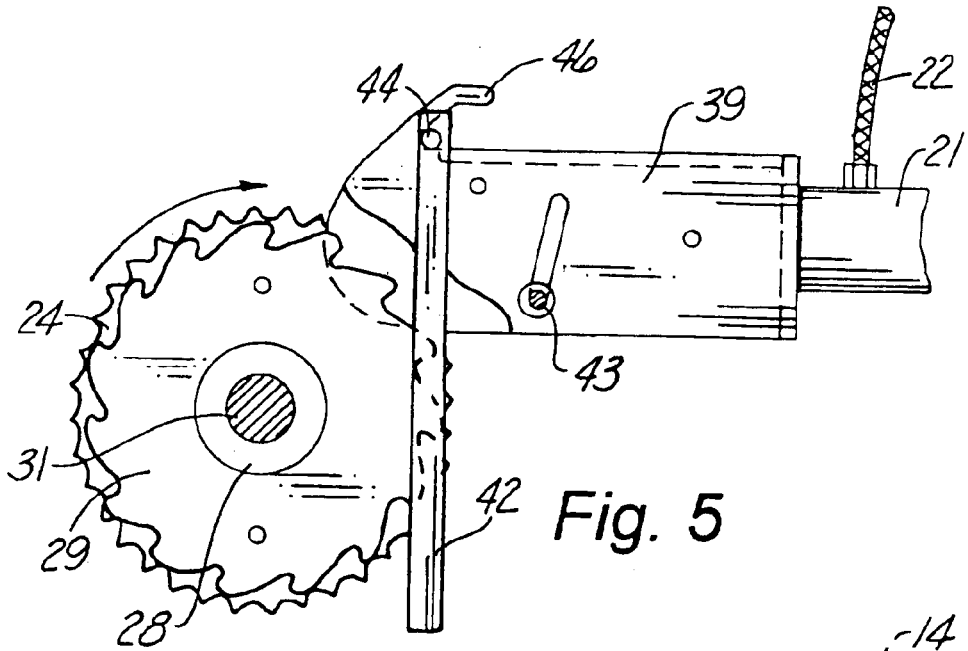
FIG. 5 is a cross sectional view showing the present invention in a normal operating position where a bale is being formed.
Figure 5A:
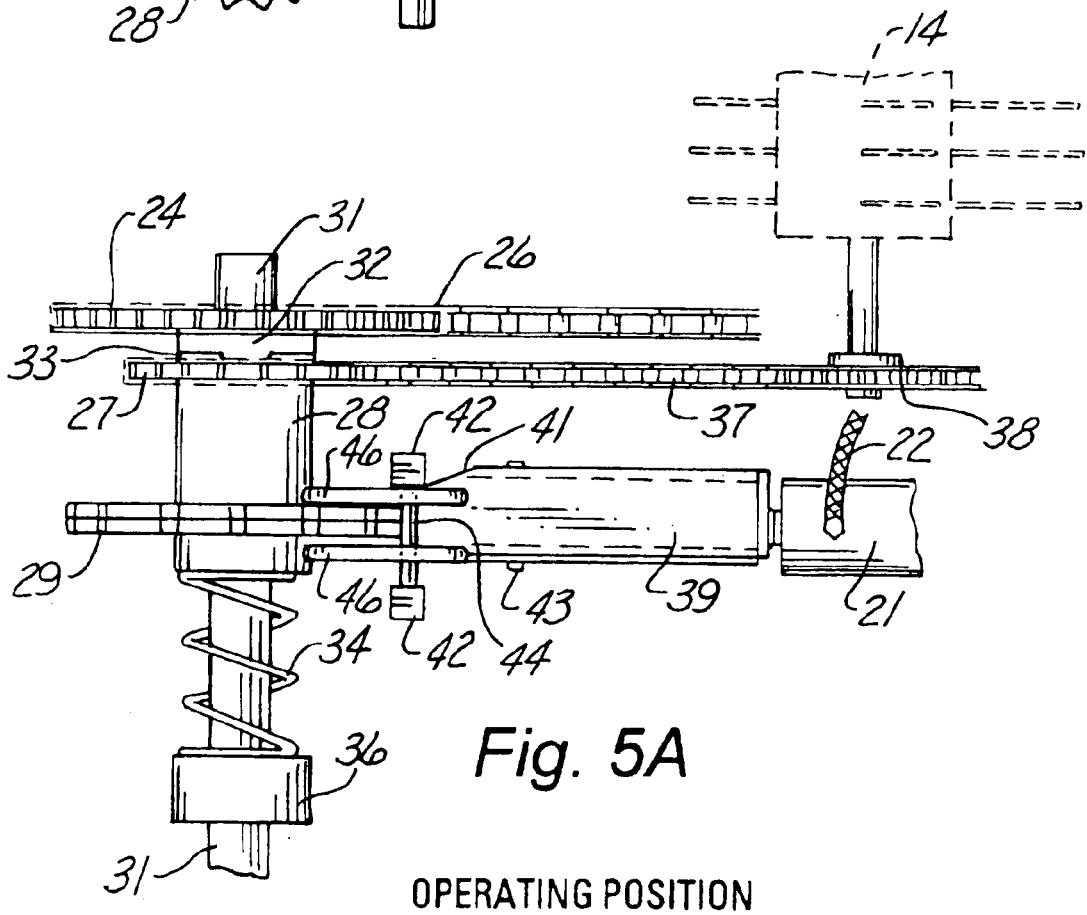
FIG. 5A is a top view of the present invention shown while a bale is being formed and is powered by the primary power to the baler.

Referring now to FIG. 5A, it is noted that a driver sprocket (24) has a chain (26) extending therearound and this chain (26) is ultimately coupled to a primary source of power which is sprocket (25) which is ultimately driven by the power-takeoff of a tractor (not shown). A reverser driven sprocket (27) is rigidly connected to a hub (28). A reverser gear (29) is also rigidly attached to the hub (28) so that in the position shown in FIG. 5A, the hub (28) rotates with the driver sprocket (24) which is rigidly attached to the shaft (31).

A projection (32) rigidly attached to the driver sprocket (24) extends into a notch (33) in hub (28) so that when the driver sprocket (24) turns, so does the hub (28) and reverser driven sprocket (27) and reverser gear (29). The hub (28) is held such that the notch (33) and projection (32) are engaged because a spring (34) is pushing the hub (28) toward the driver sprocket (24). A sleeve (36) is rigidly attached to the shaft (31) and holds the spring (34) in place and permits the hub (28) to move from the position shown in FIG. 5A to the position shown in FIG. 6A, which will be described below.

Figure 3:
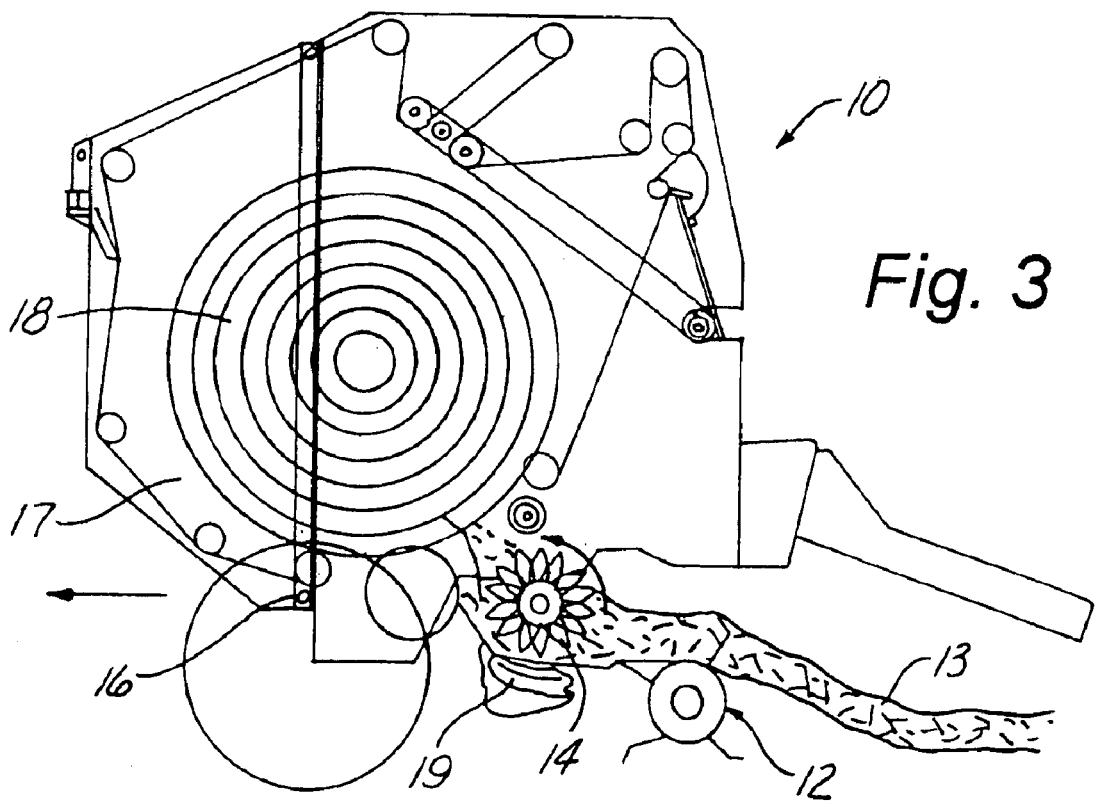
FIG. 3 is a view like FIG. 2, but showing the rotor reversing to pull crop from the throat of a baler which is plugged.

When the baler (10) is normally being used to bale the crop, such as shown in FIG. 2, the rotor (14) is moved in the direction shown in FIG. 2 by a chain (37) which engages the reverser driven sprocket (27) and engages a reverser sprocket (38). Consequently, the rotor (14) moves in whatever direction the rotor sprocket (38) turns. A reverser drive frame (39) is preferably integral with a camming surface (41) which will be referred to as a spreader (41). The drive frame (39) and camming surface (41) can be separate, however, if desired. This spreader (41) and reverser driver frame (39) are sized to fit through the slot of a rigid post (42). So, as shown in FIG. 5A, when the cylinder (21) is retracted, the spring (34) will push the hub (28) to engage and rotate with the driver sprocket (24). When the baler stops because of a blockage, the hydraulic cylinder (21) is extended to the position shown in FIGS. 6 and 6A which is the disengaging position. When this occurs, it will be appreciated that the spreader (41) has cammed against the top rigid post (42) as shown in FIG. 6A and this moves the hub (28) and everything connected to it away from the driver sprocket (24) so that the projection (32) no longer extends into notch (33). At this time, the primary power can be used to finish wrapping and putting twine or another covering on the bale (18) as shown in FIG. 3.

Figure 6:
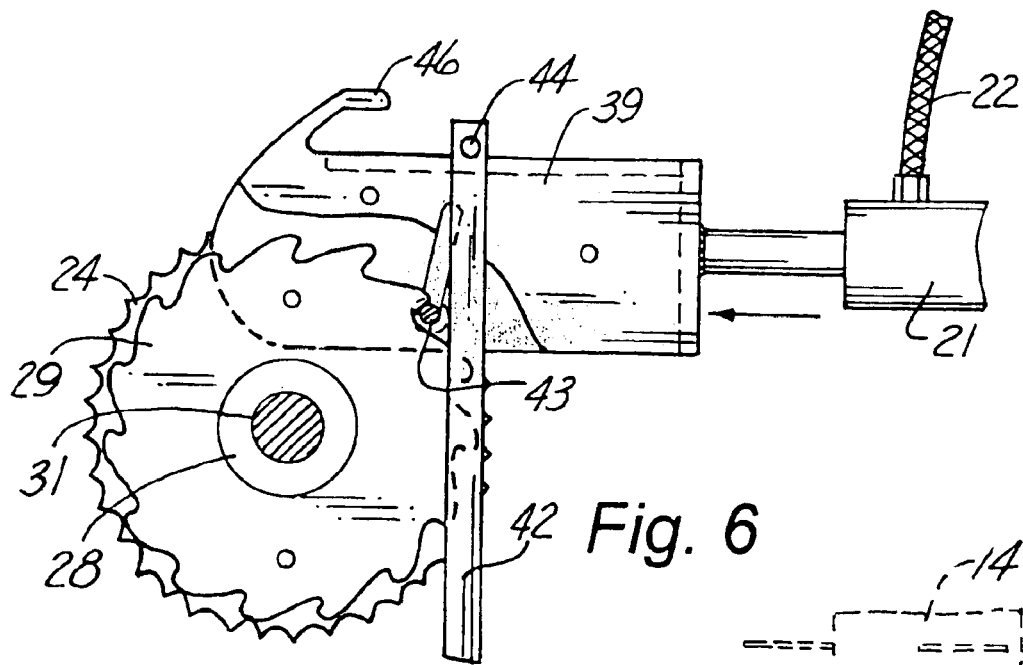
FIG. 6 is a view like FIG. 5 but showing a spreader moved by a hydraulic cylinder to disengage the drive sprocket of the reverser from the primary driven sprocket so that a bale can be formed on the one hand and on the other hand set up a condition where the rotor can be reversed.
Figure 6A:
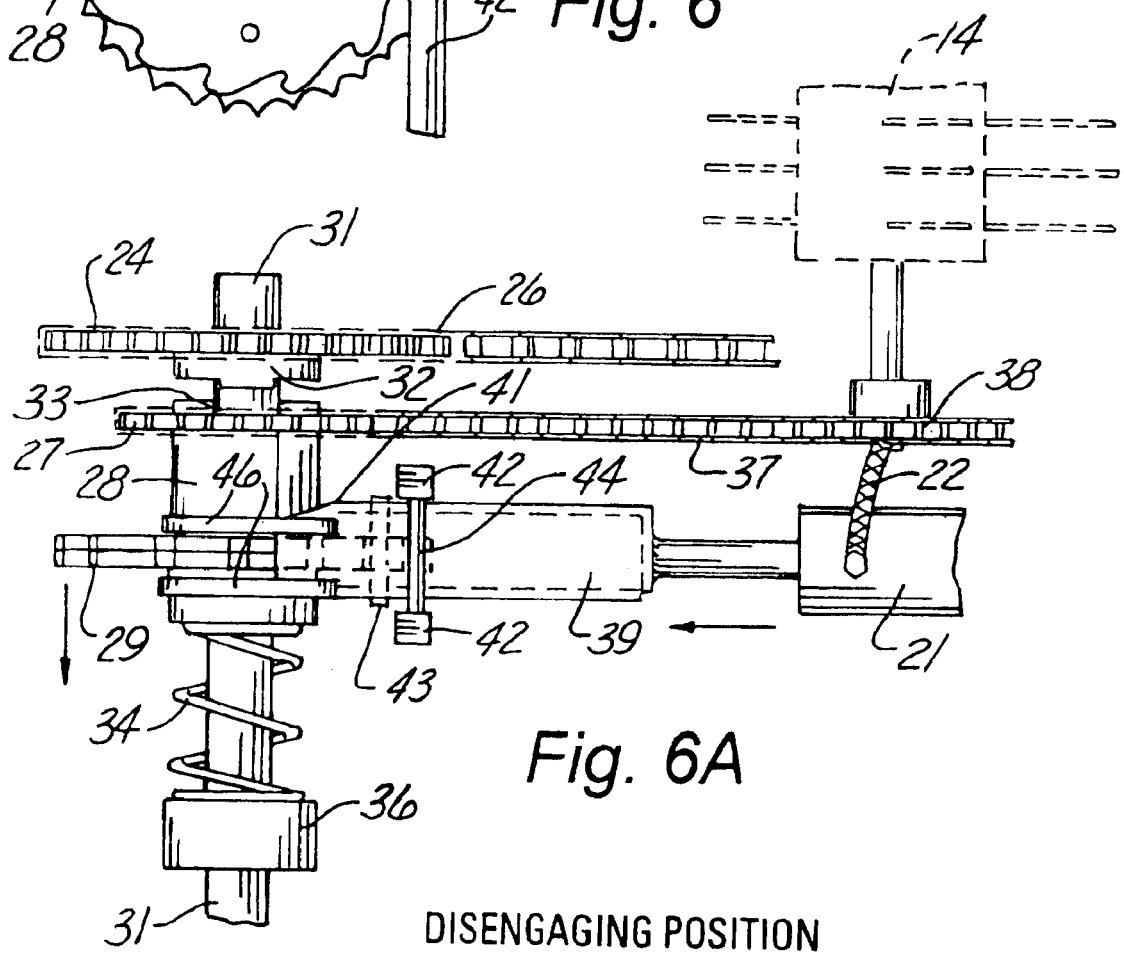
FIG. 6A is a top view of the present invention as described above in FIG. 6.
Figure 7:
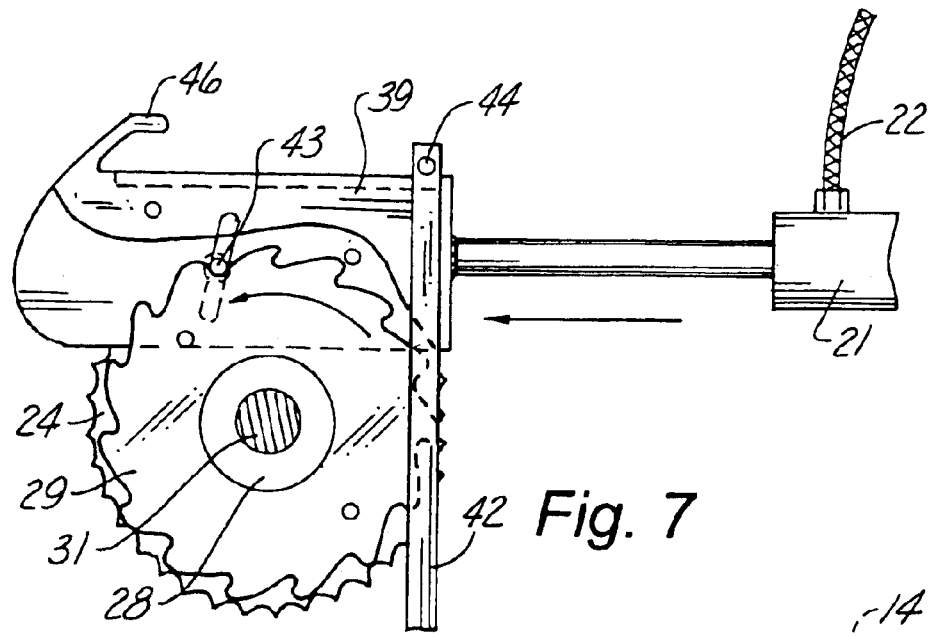
FIG. 7 shows a view showing the present device in a reversing position by extending the hydraulic cylinder even more than is shown in FIG. 6.
Figure 7A:
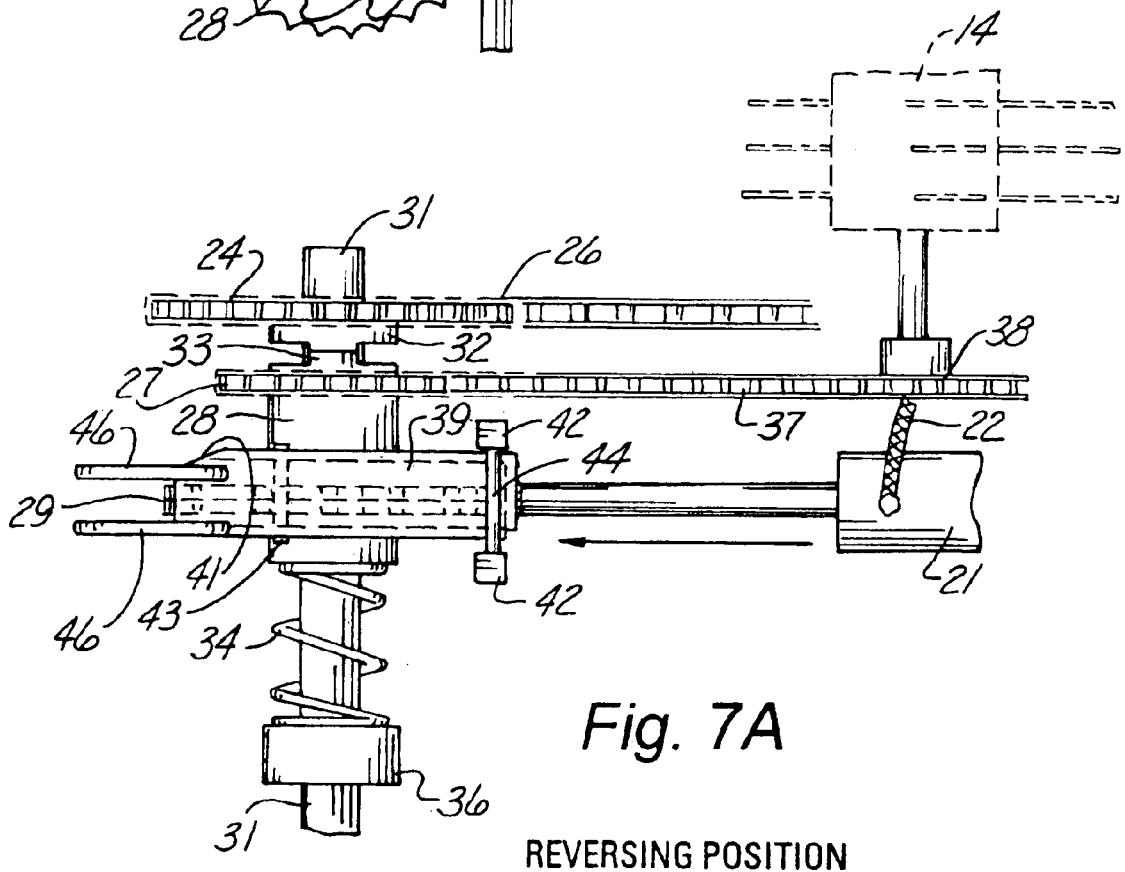
FIG. 7A is a top view of the present invention as shown in FIG. 7 and showing that the reverser is still disengaged from the primary power and also shows how it has been reversed by having a pin rotate a reverser gear, which thereby reverses the rotation of the rotor.

At this time, the hydraulic cylinder (21) can be extended further from the position shown in FIGS. 6 and 6A to the position shown in FIGS. 7 and 7A. What this does is reverse the rotation of the rotor (14) to the counter-clockwise direction shown in FIG. 3 to pull the blockage out of the throat of the baler. This is done by having the driver frame push a pin (43) which is biased downwardly to the position shown in FIG. 4 which will engage the teeth of reverser gear (29) and rotate the reverser gear (29) from the position shown in FIG. 6 to the position shown in FIG. 7. When this occurs, because the reverser gear (29) and the reverser driven sprocket (27) are both rigidly attached to the hub (28), turning of the reverser gear (29) will cause a like reversing of the reverser driven sprocket (27). Then, because of the chain (27), it will also reverse the rotor sprocket (38), thereby reversing the rotor (14). This procedure can be repeated one or two more times, for example by moving the hydraulic cylinder back to the position shown in FIG. 6, and then after that, back to the position shown in FIG. 7. This will make a partial turn of the rotor and will unblock the throat (16). Then the baler (10) will be in a condition to return to the normal baling operation. It is noted that in the preferred embodiment, the pickup reel (12) does not rotate when the reverser is in operation as shown in FIGS. 3, 6 and 7.

In order to resume the normal baling operation as shown in FIG. 2, of course without the blockage therein, the hydraulic cylinder (21) is shortened to the position shown in FIGS. 5 and 5A. This will again allow the primary power to reverser-driven sprocket (24) to turn the hub (28) and thereby turn the reverser-driven sprocket (27). This will turn the rotor sprocket (38) through reverser chain (37), again in the clockwise direction as shown in FIG. 2, to pull the windrow of crop (13) from the pickup reel (12) through the throat (16) and into the baling chamber (17) to form a bale (18).

In operation, when an operator becomes aware that the baler is plugged, the operator will disengage the power to the power take-off (PTO). At this time the operator activates the tractor's hydraulic system to provide pressure to the hydraulic cylinder (21). The reverser extends, causing the reverser spreader (41) to contact the rigid post (42). This motion, in turn, causes the reverser gear (29), reverser hub (28) and reverser-driven sprocket (27) to translate outward along the jack shaft (31). This disengages the coupling with the reverser driver sprocket (24).

At this time the rotor drive is disengaged from primary power. The operator can then turn on the PTO and continue to prepare the bale for ejection by wrapping it with twine or net wrap. The re-engagement of the PTO at this time can also aid in the removal of blockage by pulling material from the backside of the rotor (14) and onto the bale. After this has been completed, the operator will disengage the PTO. The complete extension of the hydraulic cylinder will cause the reverser drive bolt (43) to contact the reverser gear (29) and force it to rotate counter-clockwise. This motion also requires the reverser chain (37) and rotor sprocket (38) to rotate counter-clockwise, enabling the rotor (14) to turn backwards, which will drag the blockage to the front of the machine in small increments. It is believed that three or four extension and retraction cycles are typically necessary to remove the blockage completely.

The operator will now completely retract the reverser cylinder so that it pulls itself onto the carrier rod (44) by its carrier hooks (46). The spring (34) then pushes the reverser gear (29), hub (28) and driven sprocket (27) back into the normal baling position. The operator is now able to engage the PTO. The blockage will now be pulled into the baler and the operator can continue baling.

Accordingly, it will be appreciated that the preferred embodiment does indeed accomplish the aforementioned objects. A reverser for the rotor (14) could utilize a reversible gear box, a DC starter or a hydraulic motor. Therefore means-plus-function clauses are intended to cover the structures described herein as performing the recited function, i.e. not only structural equivalents, but also equivalent structures. Obviously many modifications and variations of the present invention are possible in light of the above teachings. It is therefore to be understood that, within the scope of the appended claims, the invention may be practiced otherwise than as specifically described.

We claim:

1. A bale forming machine for baling agricultural crops of a type having a frame and a rotor operatively rotatably attached to said frame for moving a windrow of crop material into a baling chamber comprising:

a power train operatively connected to a portion of the bale forming machine that forms a bale in the baling chamber, said power train also being operatively attached to a rotor which moves a crop material toward the baling chamber;

a clutch selectively operatively attached to the power train and the rotor for selectively attaching or detaching said power train to said rotor;

a reversing mechanism operatively attached to said frame for selectively reversing the direction of rotation of said rotor between said first rotary direction and a second rotary direction for causing crop to move away from said baling chamber; and an actuator comprising a hydraulic cylinder operatively attached to said clutch and to said reversing mechanism for operating both (a) said clutch to selectively connect or disconnect the rotor from the power train and (b) said reversing mechanism to selectively reverse the rotor without disconnecting the power train from the portion of the bale forming machine that forms a bale in the baling chamber.

2. A method of using a bale forming machine comprising:

using a power train on the bale forming machine to operate a part of a bale forming machine which forms a bale in a bale forming chamber to rotate a rotor during a normal operation of said bale forming machine for moving a crop into the bale forming chamber;

using an actuator which includes a hydraulic cylinder to cause a clutch to detach said power train from said rotor if said bale forming machine becomes plugged with crop material without detaching the power train from that part of a bale forming machine which forms a bale in a bale forming chamber; and also using said actuator to cause a reversing mechanism to reverse the rotary direction of said rotor to a second rotary direction to cause crop material to move away from said baling chamber.

3. A method of using a bale forming machine of a type for baling agricultural crops having a frame and a rotor operatively rotatably attached to said frame for moving a windrow of crop material into a baling chamber and a power train to operate a part of the bale forming machine which forms a bale in the baling chamber and to provide power to rotate said rotor in a first rotary direction to move the crop material toward the baling chamber and a clutch selectively operatively attached to the power train for selectively attaching or detaching said power train to said rotor with an actuator which includes a hydraulic cylinder, said method comprising:

using said actuator to cause said clutch to attach the power train to operate the bale forming machine to pick up a windrow of crop;

whenever said rotor becomes plugged with excess crop material, using said actuator to cause said clutch to disconnect the power train from that part of the bale forming apparatus which rotates the rotor without disconnecting the power train from that part of the bale forming machine which forms a bale in the baling chamber; and using said actuator to reverse the direction of rotation of said rotor between said first rotary direction and a second rotary direction for causing crop to move away from said baling chamber.

4. A baler with crop formation elements that are powered by rotating shafts including a crop pickup, a crop chopping roller, and bale formation rollers mounted on a frame and operatively connected to a driveline that transfers power to the rotating shafts with a clutch that selectively connects or disconnects a first rotating shaft that powers the crop chopping roller having a normal rotary operating direction, the driveline comprising a reverser actuator being operatively connected to said clutch and being selectively operatively connected to said first rotating shaft, said actuator having:

a first operating position wherein the actuator is not connected to said first rotating shaft and the clutch is engaged with the driveline to transfer power from the driveline to the first rotating shaft;

a second position wherein the actuator is connected to the said first rotating shaft and the clutch is operatively engaged with the first rotating shaft in a first rotary position of the first rotary shaft whereby the first rotary shaft is disengaged from the driveline whereby power is not transferred from the driveline to the first rotating shaft; and a third position wherein the actuator is operatively engaged with the first rotating shaft and the clutch is disengaged from the driveline whereby power is not transferred from the driveline to the first rotating shaft and the first rotating shaft has been moved to a second rotary position as the actuator moves from the second to the third position, said crop chopping roller being operatively attached to the first rotating shaft whereby the crop chopping roller is rotated in a direction opposite to the normal rotary operating direction as the actuator moves from the second to the third position.

5. A baler with crop formation elements that are powered by rotating shafts including a crop pickup, a crop chopping roller, and bale formation rollers mounted on a frame and operatively connected to a driveline that transfers power to the rotating shafts with a clutch that selectively connects or disconnects a first rotating shaft that powers the crop chopping roller in a normal operating direction, the driveline comprising a reverser actuator operatively connected to said clutch and selectively operatively connected to said first rotating shaft such that:

in a first position the actuator is not connected to said first rotating shaft and the clutch is engaged such that power is transferred from the driveline to the first rotating shaft;

in a second position the actuator is connected to the first rotating shaft and the clutch is disengaged such that power is not transferred from the driveline to the first rotating shaft; and in a third position the actuator is connected to the said first rotating shaft and the clutch is disengaged such that power is not transferred from the driveline to the first rotating shaft such that as the actuator moves from the second to the third position the crop chopping roller is rotated in a direction opposite to the normal operating direction.

* * * * *